No. 746,528. PATENTED DEC. 8, 1903.
G. W. LARISON.
COMBINED ROLLER AND HARROW.
APPLICATION FILED AUG. 14, 1903.
NO MODEL. 2 SHEETS—SHEET 1.
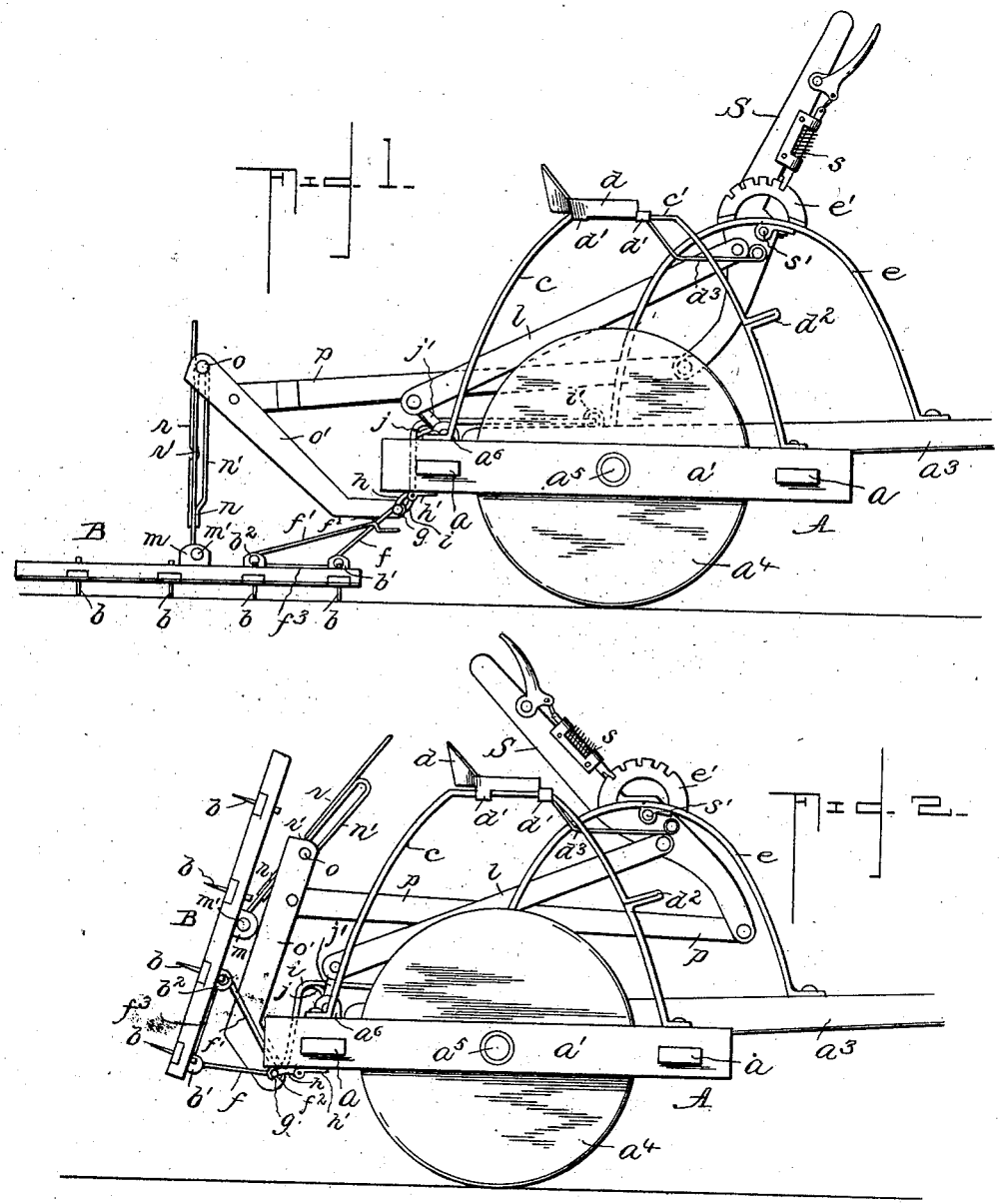
Witnesses:
R. J. Beall
N. S. Duvall
George W. Larison,
Inventor,
by John B. Thomas & Co.,
Attorneys No. 746,528. PATENTED DEC. 8, 1903.
G. W. LARISON.
COMBINED ROLLER AND HARROW.
APPLICATION FILED AUG. 14, 1903.
NO MODEL. 2 SHEETS—SHEET 2.
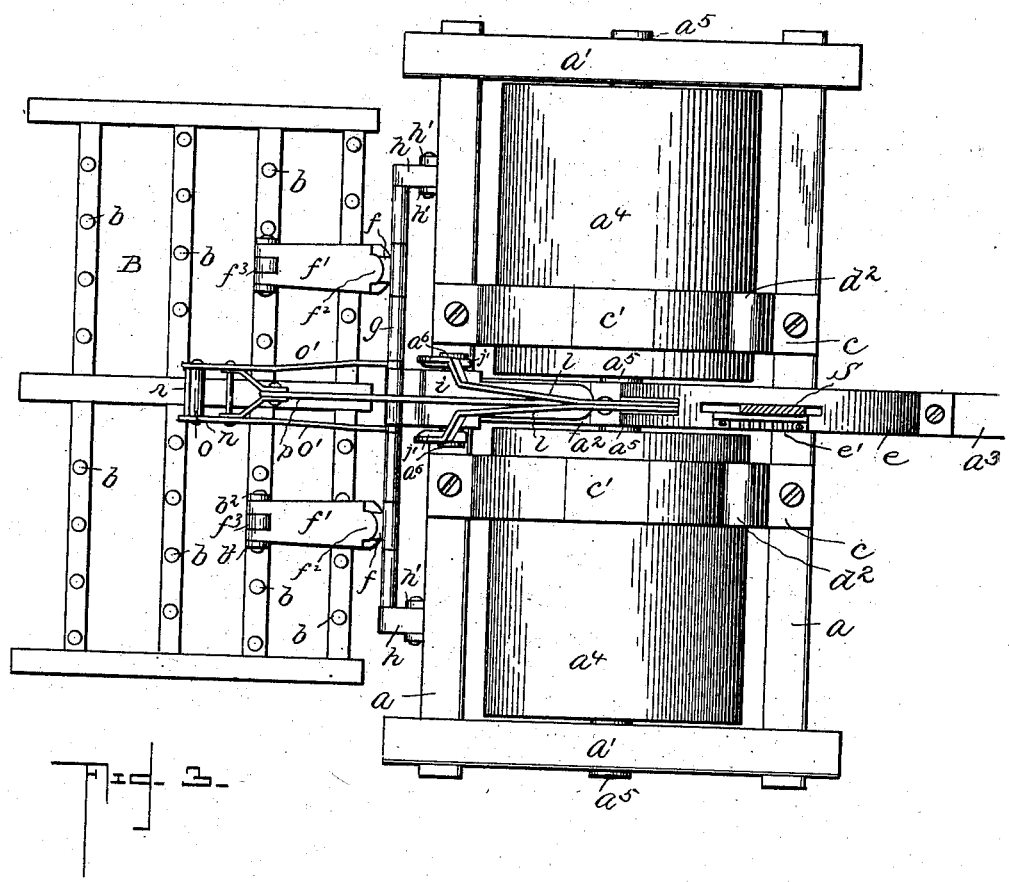
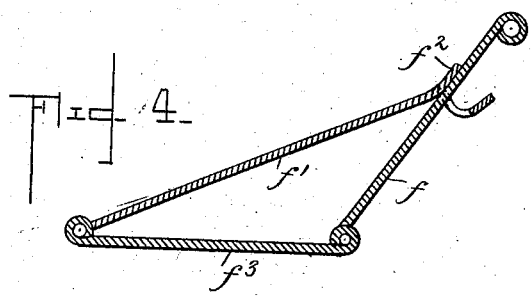
Witnesses:— George W. Larison,
Inventor,
by John V. Thomas & Co.,
Attorneys.

No. 746,528. Patented December 8, 1903.

UNITED STATES PATENT OFFICE.

GEORGE W. LARISON, OF LINCOLN, ILLINOIS.

COMBINED ROLLER AND HARROW.

SPECIFICATION forming part of Letters Patent No. 746,528, dated December 8, 1903.

Application filed August 14, 1903. Serial No. 169,513. (No model.)

*To all whom it may concern:*

Be it known that I, GEORGE W. LARISON, a citizen of the United States, and a resident of Lincoln, in the county of Logan and State of Illinois, have invented a Combined Roller and Harrow, of which the following is a specification.

This invention relates to a combined roller and harrow intended primarily for the cultivation of young corn by rolling and harrowing the ground between the rows of growing plants.

In the cultivation of young corn it is customary to roll the ground between the rows and then harrow it, and unless the harrow immediately follows the roller the ground is liable to "bake" or form a hard crust, especially if a rain intervenes, and in such event when the harrow is used the crust is broken into clods which frequently destroy the plants. When the harrow immediately follows the roller, it results not only in more effectually destroying the weeds, but also leaves the earth between the rows soft and mellow. It is advantageous, therefore, to combine the roller and harrow so that the two operations may be performed at the same time, and it is the purpose of my invention to form this combination in such manner as to be most effective and provide for readily and conveniently throwing the harrow out of operation without requiring the driver to leave his seat.

The invention consists in the particular construction and combination of parts, all as will be hereinafter fully set forth, and specifically pointed out in the appended claims.

In the accompanying drawings, which form a part of this specification, Figure 1 is a side elevation illustrating a combined roller and harrow constructed in accordance with my invention, the harrow being in its lowered position to operate upon the ground in the rear of the roller. Fig. 2 is a similar view and in which the harrow is swung upward or elevated out of operative position. Fig. 3 is a plan view of Fig. 1. Fig. 4 is a detail sectional view of the hinge connection between the roller and harrow.

Similar letters of reference indicate similar parts in all the figures of the drawings.

Referring to said drawings, the letter A designates the roller, and B the harrow, which are of the usual construction, but are connected together in a peculiar manner, so that the harrow will be drawn in the rear of the roller and permitted a slight rocking motion and the machine provided with means by which said harrow may be maintained in either an operative position directly behind the harrow or swung upward, so that the roller may be used alone when desired.

The roller A consists of a rectangular frame composed of the beams $a$ and $a'$, with a central cross-piece $a^2$, upon which latter the draft-tongue $a^3$ is secured. Rollers $a^4$ are mounted in this frame at each side of the central cross-piece $a^2$, leaving sufficient space between said rollers so that the latter will operate at opposite sides of the growing plants and not interfere with the same. The rollers $a^4$ are provided with gudgeons or short shafts $a^5$, journaled in the cross-pieces $a'$ and $a^2$ of the roller-frame.

Mounted upon the roller-frame above the rollers $a^4$ are arched seat-supports $c\,c$, secured at their ends upon the beams $a$ and provided above the rollers with straight horizontal portions $c'$, upon which the seat $d$ is adapted to slide. The seat is slidably connected to the horizontal portions of the seat-supports by means of clips $d'$, and the forward portion of each seat-support at a suitable distance below the seat is bent upon itself, as at $d^2$, to provide foot-rests for the driver. The seat $d$ is movable back and forward upon its supports, so that the position of the driver may be changed with respect to the disposition of the harrow, and in order that this shifting of the driver's seat may be effected automatically it is connected to the operating-lever S by rods $d^3$, said operating-lever being located in front of the seat and fulcrumed in an arched frame $e$, projecting upward from the draft-tongue. This lever is provided with the usual sliding pawl $s$, engaging a segment-rack $e'$ for holding said lever in an adjusted position, the latter also serving to raise and lower the harrow, as hereinafter described.

The harrow B consists of a frame, as is usual, carrying the teeth $b$, the latter being spaced apart at the center of the harrow, so as not to operate too near the growing plants. The harrow is hingedly connected to the roller-frame by means of links $f$, pivoted to the harrow between ears $b'$ thereon and to the roller-frame by a transverse shaft $g$, supported at the lower ends of short links $h$, the latter being pivoted at their other ends in eye-plates $h'$, secured to the under side of the roller-frame. In addition to the links $f$ and forming part of this hinge connection are supplemental links or plates $f'$, which are disposed at substantially right angles to the links $f$, said supplemental links or plates being pivoted to ears $b^2$ on the harrow a short distance in rear of the ears $b'$ and at their forward ends slidable upon the aforesaid links $f$ and shaped at this end to engage the shaft $g$ when the harrow is thrown to an elevated position. For this latter purpose the forward end of the plate $f'$ is cut away centrally to provide a tongue $f^2$, bent slightly upward and adapted to bear against the face of the link and provide one of the shaft-engaging members, while the terminal portion of said end is bent outward and upward in rear of the link to form the other engaging member, the link $f$ passing through the opening in the rear of the tongue. It will be observed that this plate $f'$ is free to ride upon the link when the harrow is lowered, permitting a rocking movement of said harrow, and that when the harrow is elevated serves to support the same at a distance above the ground, acting as a fulcrum when the harrow is swung upward. The ears $b'$ and $b^2$ on the harrow and to which the link and plate are respectively pivoted are preferably connected by a plate $f^3$, so that when the harrow is in its elevated position a triangular-shaped hinge connection is provided to firmly support said harrow. To further elevate the harrow above the ground, the shaft $g$, upon which it is directly supported, is raised, and for this purpose said shaft is connected to the lower end of a plate $i$, extending upward and over the rear part of the draft-tongue to a staple $i'$, to which latter it is pivoted. Under this plate is arranged a cam-plate $j$, projecting from a transverse shaft mounted in ears $a^6$ and having cranks $j'$, to which latter are connected links $l$, pivoted at their other ends to the lever S, near the fulcrum thereof.

At the central portion of the harrow are secured ears $m$, forming bearings for a transverse shaft $m'$, to which is pivoted a plate $n$, bent upon itself to provide an elongated loop $n'$, in which travels a roller $o$ at the rear end of a lever $o'$, which latter is fulcrumed on the shaft $g$, suspended from the roller-frame. A link $p$ is connected to near the outer end of the lever $o'$ and at its opposite end is pivoted to the lower end of the operating-lever S, and by means of this link and aforesaid connections the harrow is raised and lowered upon the operation of the lever.

To one side of the connecting-loop $n$ is attached a spring-catch $r$, having an offset or engaging portion $r'$, which projects into the loop and is adapted to engage the roller $o$ of the lever $o'$. Said connecting-loop permits the harrow to be tilted forward after it is elevated, and when tilted forward the catch will engage the roller and hold the harrow in such forwardly-tilted position.

It will be understood that the rollers and harrow are adapted to cultivate the ground at opposite sides of a row of growing plants and that the horses are hitched at opposite sides of the draft-tongue, so as to walk between the rows.

In the operation of the combined roller and harrow the lever S is thrown forward so as to lower the harrow to the ground, and it will be dragged in rear of the roller, whereby in the cultivation of corn the ground between the rows will be rolled and then immediately harrowed. Now when it is desired to elevate the harrow out of operation it is only necessary to throw the lever S rearward, which will draw upon the connecting-links $p$ and $l$ to swing the harrow upward upon its hinge connections $f$ and $f'$ and will also raise the shaft $g$ to further elevate the harrow and parts carried thereby. Simultaneously with this operation the seat, through the intervention of the connecting-rods $d^3$, is moved forward, so that the weight of the rider will be shifted to counterbalance the weight of the elevated harrow. When the harrow is elevated, as shown in Fig. 2 of the drawings, it will be supported from the roller-frame some distance above the ground, so as not to be injured during transportation of the machine from place to place or while the roller is being used alone.

The relative sizes of the roller and harrow may be changed, as well as the construction of same, as it will be understood that my invention contemplates the combination of the roller and harrow in a single machine that shall be of light draft and easily operated.

Having thus described my invention, what I claim as new, and desire to secure by Letters Patent, is—

1. The combination with a roller and its frame, of a harrow connected thereto by links, plates pivoted to the harrow in rear of the links and slidably connected to the roller-frame, and a stop with which said plates engage, substantially as shown and for the purpose set forth.

2. The combination with a roller and its frame, of a harrow connected thereto by links, and plates pivoted to the harrow in the rear of the links and at their forward ends adapted to slide upon said links and adapted to engage stops at the forward ends of the latter, substantially as shown and for the purpose set forth.

3. The combination with the roller and its frame, of a harrow connected thereto by links, plates pivoted to the harrow in the rear of the links and at their forward ends adapted to slide upon said links, and a stop on the roller-frame with which said forward ends of the plates engage, substantially as shown and for the purpose set forth.

4. The combination with the roller and its frame, of a harrow connected thereto by links, plates pivoted to the harrow in the rear of the links and at their forward ends adapted to slide upon said links, stops on the roller-frame with which the pivoted plates engage, and means for swinging the harrow upward upon said connections, substantially as shown and for the purpose set forth.

5. The combination with the roller and its frame, of a harrow connected thereto by links, plates pivoted to the harrow in rear of the links and at their forward ends slidable upon said links, stops on the roller-frame with which the pivoted plates engage, a connecting-loop pivoted to the harrow, an operating-lever, and a link connecting the loop and lever, substantially as shown and for the purpose set forth.

6. The combination with the roller and its frame, of a harrow connected thereto by links, plates pivoted to the harrow in the rear of the links and at their forward ends slidable upon said links, and stops on the roller-frame with which the pivoted plates engage; together with a connecting-loop pivoted to the harrow, an operating-lever, a link pivoted to the lever and slidably connected to the loop, and a catch on the loop adapted to engage the lever, substantially as shown and for the purpose set forth.

7. The combination with a roller and its frame, of a harrow connected thereto by links, plates pivoted to the harrow in the rear of the links and at their forward ends slidable upon said links, and stops on the roller-frame with which said pivoted plate engages; together with a loop pivoted to the harrow, an operating-lever, a link connected to the lever and slidably connected to the said loop, and a spring-metal plate attached to one side of the loop and having an offset projecting into the same, substantially as shown and for the purpose set forth.

8. The combination with a roller and its frame, of a shaft suspended therefrom, a harrow connected to said shaft by links, and plates pivoted to the harrow in the rear of the links and adapted to engage the shaft to serve as a fulcrum for the harrow.

9. The combination with a roller and its frame, of a shaft suspended therefrom, a harrow connected to said shaft by links, and plates pivoted to the harrow in the rear of the links and at their forward ends slidable upon said links, the ends of said pivoted plates being adapted to engage the shaft to serve as a fulcrum in elevating the harrow.

10. The combination with a roller and its frame, of a harrow having longitudinal plates connecting pairs of pivot-bearings, links connected to the forward pivot-bearings and to the roller-frame, pivot-plates connected to the rear pivot-bearings and at their forward ends slidable upon said links, and stops on the roller-frame with which said forward ends of the pivot-plates are adapted to engage.

11. The combination with a roller and its frame, of a harrow connected thereto by links, and supplemental links connected to the harrow and roller at substantially right angles to the aforesaid links.

12. The combination with the roller and its frame, of a harrow connected thereto by links, and supplemental links connected to the harrow and roller at substantially right angles to the aforesaid links and having a limited sliding movement at one end.

13. The combination with the roller and its frame, of a harrow, links connecting said harrow to the roller-frame, and supplemental links connected to the roller-frame and to the harrow in rear of the aforesaid links, said supplemental links having a limited sliding movement at one end, and means for swinging the harrow on said connections.

14. The combination with the roller and its frame, of a harrow, links connecting said harrow to the roller-frame, means for swinging the harrow upon said links, said means comprising a lever and connecting means, a slidable seat upon the roller-frame, and rods connecting said seat to said lever.

15. The combination with the roller and its frame, of a harrow, a shaft suspended from the roller-frame by links, links connecting the harrow to said shaft, and means for raising said shaft.

16. The combination with the roller and its frame, of a shaft suspended from said roller-frame by links, a harrow connected to the shaft by links, supplemental links or plates connected to the harrow in the rear of the aforesaid links and to the shaft, said latter links having a sliding movement at one end, and means for raising the shaft.

17. The combination with the roller and its frame, of a shaft suspended from said roller-frame by links, a harrow connected to said shaft by links, a plate connected to the roller-frame and shaft, a cam-plate adapted to elevate the aforesaid plate and thereby elevate the shaft, means for operating the cam, and means for swinging the harrow upon its connections.

18. The combination with the roller and its frame, of a shaft suspended from said roller-frame by links, a harrow connected to said shaft by links, plates pivoted to the harrow in the rear of the links and at their forward ends slidable upon said links and adapted to engage the shaft, a plate connected to the shaft, a cam-plate adapted to lift said plate, a lever connected to the cam-plate, a loop pivoted to the harrow, a link pivoted to the lever and slidably connected to said loop, and a catch on the loop adapted to engage the connecting-link.

In testimony whereof I have signed my name to this specification in the presence of two subscribing witnesses.

GEORGE W. LARISON.

Witnesses:
A. D. CADWALLADER,
GEO. D. CORWINE.